United States Patent [19]
Adkins

[11] Patent Number: 5,854,449
[45] Date of Patent: Dec. 29, 1998

[54] HIGH ACCURACY DIGITIZER SYSTEM

[75] Inventor: David L. Adkins, Phoenix, Ariz.

[73] Assignee: CalComp Inc., Anaheim, Calif.

[21] Appl. No.: 526,185

[22] Filed: Sep. 11, 1995

[51] Int. Cl.[6] .............................. G08C 21/00; G09G 5/00
[52] U.S. Cl. .................................. 178/18.02; 178/18.01; 178/18.03; 178/19.01; 345/178; 345/179
[58] Field of Search .................................. 345/156, 157, 345/162, 179, 173, 178; 128/18.01, 18.02, 18.03, 18.05, 18.07, 19.01, 19.03

[56] References Cited

U.S. PATENT DOCUMENTS

| | | | |
|---|---|---|---|
| 4,477,877 | 10/1984 | Nakamura | 178/19 |
| 4,560,830 | 12/1985 | Perl | 178/19 |
| 4,638,119 | 1/1987 | Blesser | 178/19 |
| 4,649,232 | 3/1987 | Nakamura | 178/18 |
| 4,678,869 | 7/1987 | Kable | 178/18 |
| 4,686,329 | 8/1987 | Joyce | 178/18 |
| 4,710,758 | 12/1987 | Mussler | 345/178 |
| 4,806,708 | 2/1989 | Yahagi | 178/19 |
| 4,928,256 | 5/1990 | Parnell | 178/19 |
| 5,120,907 | 6/1992 | Shinbori | 178/19 |
| 5,157,227 | 10/1992 | McDermott | 178/19 |
| 5,194,699 | 3/1993 | Zalenski | 178/19 |
| 5,198,623 | 3/1993 | Landmeier | 178/19 |
| 5,218,174 | 6/1993 | Gray | 178/18 |
| 5,471,220 | 11/1995 | Suzuki et al. | 345/178 |
| 5,668,352 | 9/1997 | Christian et al. | 178/18 |

Primary Examiner—Vijay Shankar
Attorney, Agent, or Firm—Frederic P. Smith; William F. Porter, Jr.

[57] ABSTRACT

A high accuracy digitizer system for determining the position of a pointer relative to a tablet comprising a tablet having a positional grid thereon, a processor for determining the coarse position of the pointer relative to the tablet, and an error correction system for generating the true position of the pointer relative to the tablet. In a particular embodiment, the pointer includes an electromagnetic transducer for inducing a signal in the positional grid and the processor is coupled to the positional grid for sensing the signal and generating the coarse position of the pointer. The error correction system receives the coarse position from the processor and generates a true position, the positional grid containing positional inaccuracies therein and the error correction system correcting for such inaccuracies.

10 Claims, 2 Drawing Sheets

HIGH ACCURACY DIGITIZER SYSTEM

BACKGROUND OF THE INVENTION

1. Field of the Invention

This invention relates to the field of graphic digitizer systems and, in particular, to a high accuracy graphic digitizer system which utilizes a grid position error correction system to improve pointer position accuracy.

2. Description of Related Art

Graphic digitizer systems are used in the art for translating the position of a point on a plan or drawing into coordinates recognizable by a computer. In general, a tablet is used which has an x-y positional grid thereon and the position of the pointer is determined relative to such grid by energizing the pointer and reading the signals induced in the grid or energizing the grid and reading signals induced in the pointer. In either case, the accurate positioning of the grid wires is critical in order to get a true position of the pointer relative to the tablet. In the prior art systems, the apparent electrical placement of the wires was measured with a two-axis measurement system and compared to the physical placement of the wires. The grid of wires was then redesigned using "bent" wires to compensate for the errors. This redesign generally involved moving the placement of lines on a mask used to generate a printed wire or film conductive matrix, an expensive and labor intensive operation. This "bent" grid wire method had a number of major problems. The grid had to be designed and fabricated at least twice, once to collect data and once to change placement of the wires for correction, thus adding an extra cycle and additional lead time and labor and material to the cost of the prototypes. The moved wires and connections often led to changed electromagnetic conditions and an iterative data collection process to ensure maximum accuracy. Finally, wires could not always be moved the required amount due to physical and dimensional limitations and thus specified accuracy design goals were unable to be met.

Thus, it is a primary object of the present invention to provide a high accuracy digitizer system.

It is another object of the present invention to provide a high accuracy digitizer system that does not require any special grid or pointer design requirements.

It is a further object of the present invention to provide a high accuracy digitizer system in which the grid needs to be designed and prototyped only once.

It is still another object of the present invention to provide a high accuracy digitizer system which requires only a single data collection for a particular design.

It is a further object of the present invention to provide a high accuracy digitizer system which minimizes the risk of not meeting design goals with the first grid design.

It is a further object of the present invention to provide a high accuracy digitizer system which can be very easily modified if a hardware change is required.

SUMMARY OF THE INVENTION

A high accuracy digitizer system for determining the position of a pointer relative to a tablet is provided comprising a tablet having a positional grid thereon, a processor for determining the coarse position of the pointer relative to the tablet, and an error correction system for generating the true position of the pointer relative to the tablet. In a particular embodiment, the pointer includes an electromagnetic transducer for inducing a signal in the positional grid and the processor is coupled to the positional grid for sensing the signal and generating the coarse position of the pointer therefrom. The error correction system receives the coarse position from the processor and generates a true position therefrom, the positional grid containing positional inaccuracies therein and the error correction system correcting for such inaccuracies.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
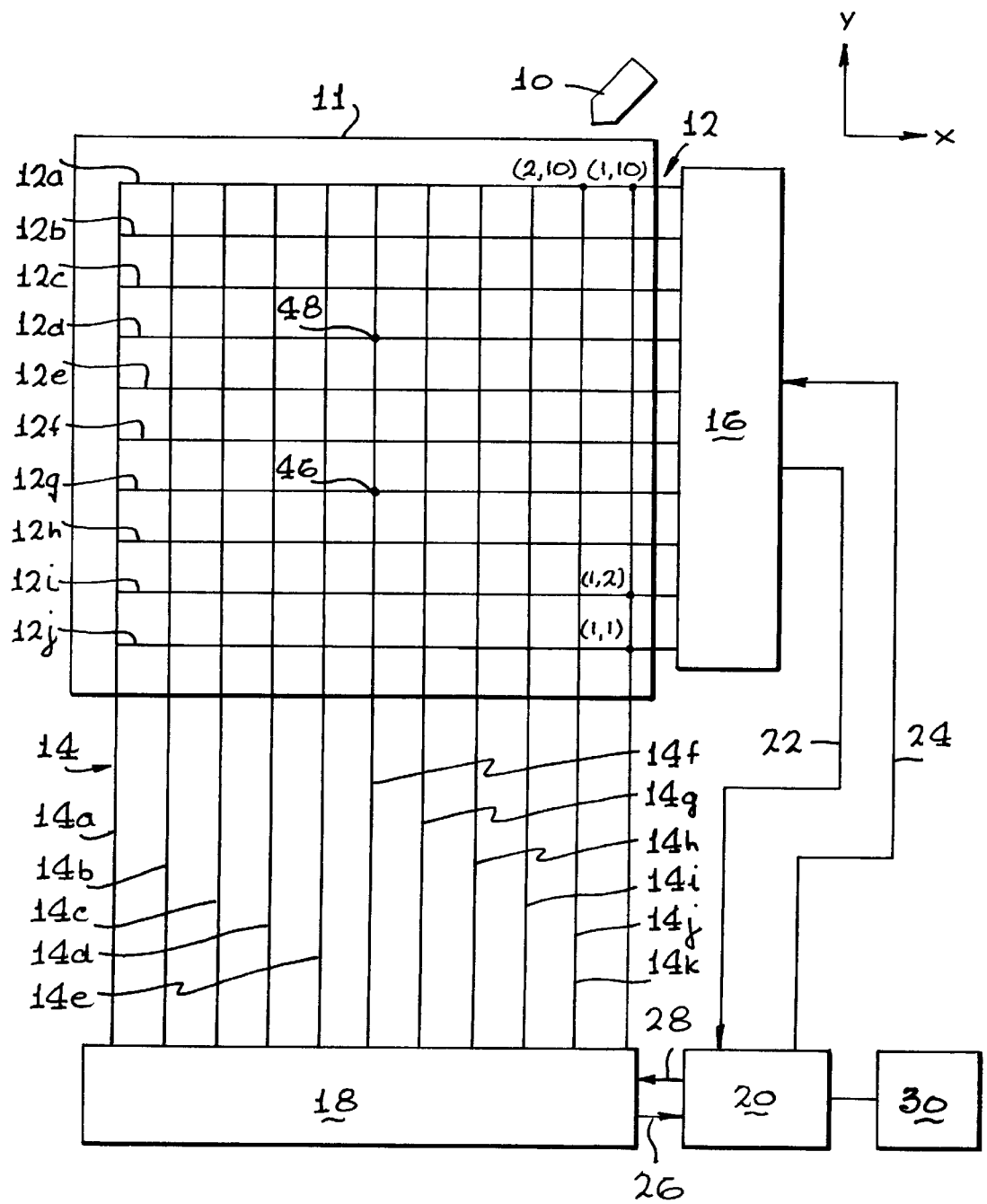
FIG. 1 is a block diagram illustrating the structure and operation of the present invention.

Referring now to FIG. 1, the structure and operation of the digitizer system is illustrated. A pointer 10 whose position is to be determined relative to a tablet 11 is shown placed adjacent to overlayed grids 12,14 of conductors 12a–j,14a–k generally deposited on tablet 11 and sometimes referred to as y and x conductors, respectively. The pointer 10 is generally an electromagnetic transducer with a flat, round transducer coil therein and is coupled to the grids 12,14 for inducing signals therein. Grids 12,14 are coupled to multiplexers 16,18. The digitizer system is controlled by controller 20, generally a microprocessor, which receives a signal along line 22 from multiplexer 16 and determines which of the particular conductors 12a–j of grid 12 is generating the signal by means of an address signal along line 24. In a like manner, controller 20 receives a signal along line 26 through multiplexer 18 and determines which of the particular conductors 14a–k of grid 14 is generating the signal by means of an address signal along line 28. Using the information from four bounding x-y intersections along with the x and y conductor spacings, generally 0.4 inches, and interpolation techniques as described in U.S. Pat. No. 4,423,286, issued Dec. 27, 1983, entitled "Apparatus and Method for Determining the Position of a Driven Coil within a Grid of Spaced Conductors", controller 20 determines the coarse position of the pointer 10 and the ratio of the distance to the next x or y conductor. Controller 20 is coupled to an error correction system 30, more fully described hereinafter, which receives the coarse position from the controller 20 and generates a true position therefrom to compensate for positional inaccuracies. These positional inaccuracies may be due to actual inaccuracies in the physical placement of the conductors 12a–j,14a–k on the tablet 11, or to perceived inaccuracies due to edge effects at the edges of the grids 12,14 where the electromagnetic field of the pointer 10 radiates into the return lines, loop-back effects where the x and y conductors are looped over the surface of the tablet 11 and the electromagnetic field of the pointer 10 spreads too far and causes anomalous cross-talk type effects in adjacent loops, and any other field distortion effects which may be caused by the particular construction of the digitizer system.

Figure 2:
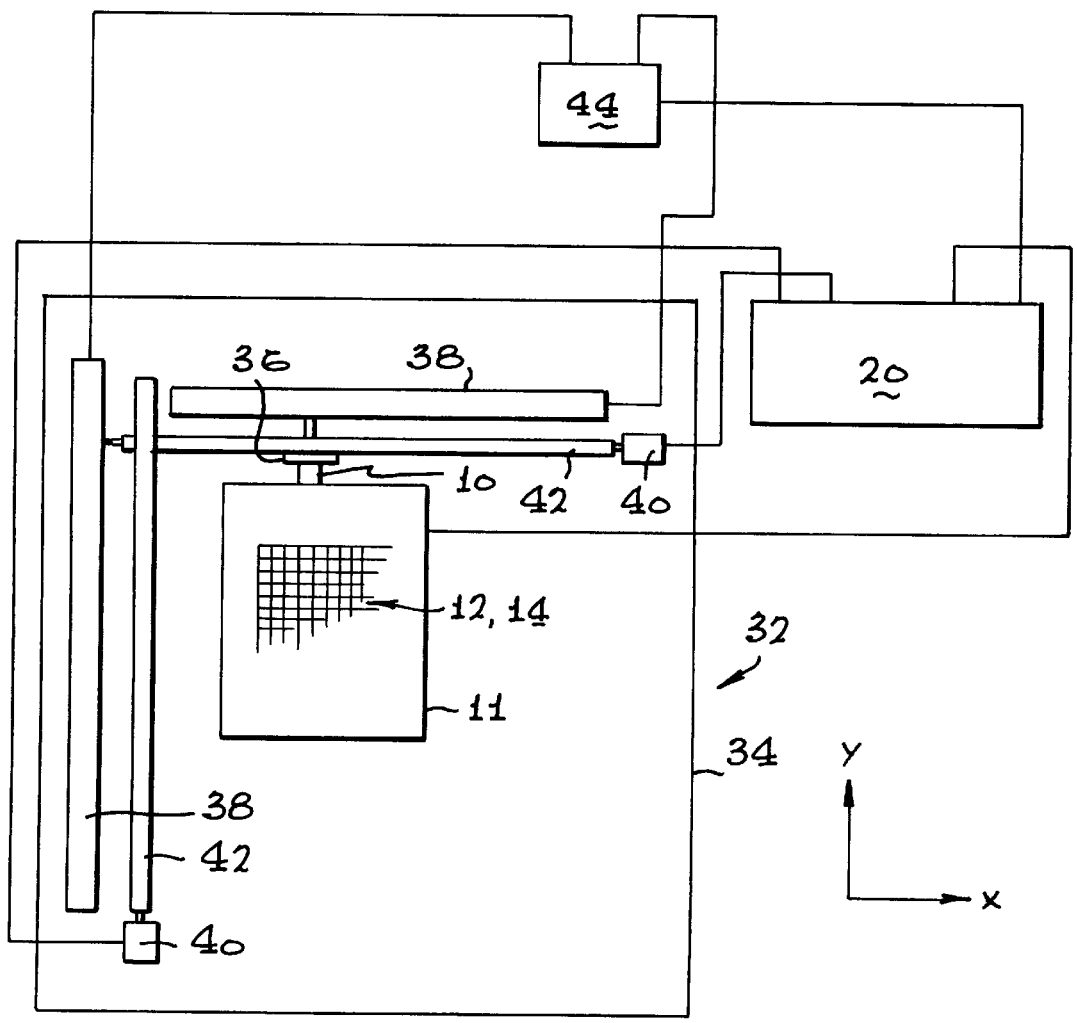
FIG. 2 is a block diagram illustrating in conjunction with FIG. 1 the method of producing the present invention.

Referring now to FIGS. 1 and 2, in order to produce the error correction system 30 to generate the true position of pointer 10 adjacent to the tablet 11 and the grids 12,14, the tablet 11 is placed in a precision measurement system 32 including a frame 34, a pointer mount 36, an orthogonal pair of precision glass position encoders 38 and a pair of stepping motors 40 mounted to orthogonal lead screws 42 which drive the pointer mount 36. The y conductors of the grids 12,14 of the digitizer system are is manually aligned with the x-axis of the measurement system 32 by placing the upper left corner of the tablet 11 into the upper left corner of the frame 34. The measurement system 32 is coupled to controller 20 which causes the stepping motors 40 and the lead screws 42 to move the pointer 10 across the surface of the tablet 11. The grids 12,14 are coupled to the controller 20 as before while the position encoders 38 are coupled to a position display 44 which is also coupled to the controller 20.

The pointer 10 is initially moved to a digitizer reference point 46 defined as the x-y conductor intersection nearest to one-half of the distance along the x-axis and one-third of the distance along the y-axis. The pointer 10 is then moved to an x alignment point 48, without moving along the x-axis, defined as the x-y conductor intersection point nearest to one-half of the distance along the x-axis and two-thirds of the distance along the y-axis. The position of the pointer 10 is then displayed on the position display 44 and the tablet 11 is manually rotated until the pointer 10 is over the x coordinate for the alignment point 48. The pointer 10 is then alternately moved to the reference point 46 and the alignment point 48 and the position of the tablet 11 adjusted until the x coordinates for the reference point 46 and the alignment point 48 match. The position of the reference point 46 is assumed to have no error.

After the tablet 11 and the grids 12,14 have been aligned with the measurement system 32, the controller 20 moves the pointer 10 in a predetermined manner starting at intersection point (1,1) and moving up and down the y-axis in a serpentine fashion to, for example, intersection points (1,2), (1,10), (2,10), etc. until the last intersection point is reached. At the same time, the controller 20 stores the positions of the pointer 10 as determined by both the intersection point number of the grid 12,14 and the measurements taken by the precision encoders 38 of the measurement system 32. Starting with the reference point 46 coordinate number, the x,y position measured by the measurement system 32 and no assumed error, the error in x and the error in y for each intersection point is then calculated by controller 20 using the difference between the pointer position derived from the intersection point number and the x and y conductor spacings and the pointer position measured at each intersection point by the precision encoders 38. These errors are then stored in the error measurement system 30 which receives the coarse position from the controller 20 and adds the error thereto to generate the true position of the pointer 10. Using the above system, a position accuracy of ±0.002 inches from perfect position was obtained using a glass scale accuracy of ±0.0001 inches and a fixture accuracy of ±0.00025 inches.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

I claim:

1. A high accuracy digitizer system for determining the position of a pointer relative to a tablet comprising:

a tablet having a positional grid thereon, said positional grid having positional inaccuracies therein;

location means for determining the coarse position of said pointer relative to said tablet utilizing said positional grid on said tablet; and error correction means containing information regarding said positional inaccuracies in said positional grid and coupled to said location means for receiving said coarse position from said location means and for generating the true position of said pointer relative to said tablet.

2. The digitizer system of claim 1 wherein said pointer includes an electromagnetic transducer for inducing a signal in said positional grid and said location means is coupled to said positional grid for sensing said signal and generating said coarse position of said pointer therefrom.

3. The digitizer system of claim 2 wherein said positional grid is an x-y grid of spaced conductors and said location means determines the x and y wire position of said pointer and the ratio of the distance to the next conductor.

4. The digitizer system of claim 1 wherein said positional grid is an x-y grid of spaced conductors and said location means includes first and second multiplexer means coupled thereto for receiving signals from said conductors for determining the x and y position of said pointer.

5. The digitizer system of claim 1 wherein said error correction means has stored therein x and y errors for each intersection point of said positional grid and applies said errors to said coarse position to generate said true position.

6. The method of producing a high accuracy digitizer system for determining the position of a pointer relative to a tablet having a positional grid thereon comprising:

placing a pointer in a plurality of selected positions over said positional grid;

generating a plurality of determined positions of said pointer from said positional grid correlating to said selected positions;

measuring the position of said pointer for each of said selected positions to generate a plurality of measured positions;

comparing each of said determined positions with each of said measured positions to determine deviations therefrom; and generating an error correction system from said deviations for use with said tablet to produce said high accuracy digitizer system.

7. The method of claim 6 wherein said tablet is placed in a measurement system having said pointer mounted on orthogonal position encoders for placing said pointer in said plurality of selected positions over said positional grid.

8. The method of claim 7 wherein said measurement system measures the position of said pointer for each of said selected positions and generates said plurality of measured positions.

9. The method of claim 8 wherein said pointer includes an electromagnetic transducer for inducing a signal in said positional grid and said positional grid is coupled to a location system for generating said plurality of determined positions.

10. The method of claim 9 wherein said location system compares each of said determined positions with each of said measured positions to determine said deviations, said deviations being stored in said error correction system.

* * * * *